US012129143B2

(12) United States Patent
Furumido et al.

(10) Patent No.: US 12,129,143 B2

(45) Date of Patent: *Oct. 29, 2024

(54) MEDIA PROCESSING APPARATUS AND RECORDING APPARATUS

(71) Applicant: SEIKO EPSON CORPORATION, Tokyo (JP)

(72) Inventors: Tsuyoshi Furumido, Shiojiri (JP); Masaki Miyazawa, Matsumoto (JP); Masayoshi Miyakawa, Suwa (JP); Hiroki Chino, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,508

(22) Filed: Jul. 27, 2022

(65) Prior Publication Data

US 2022/0363507 A1 Nov. 17, 2022

Related U.S. Application Data

(63) Continuation of application No. 17/021,378, filed on Sep. 15, 2020, now Pat. No. 11,434,099.

(30) Foreign Application Priority Data

Sep. 18, 2019 (JP) ................................ 2019-169588

(51) Int. Cl.

*B41J 13/00* (2006.01)

*B41J 13/02* (2006.01)

(Continued)

(52) U.S. Cl.

CPC .......... *B65H 37/04* (2013.01); *B41J 13/0036* (2013.01); *B41J 13/02* (2013.01); *B65H 29/12* (2013.01); *B65H 43/00* (2013.01)

(58) Field of Classification Search

CPC . G03G 2215/0089; G03G 2215/00421; G03G 15/6552; G03G 15/6573;

(Continued)

(56) References Cited

U.S. PATENT DOCUMENTS

| | | | | |
|---|---|---|---|---|
| 6,241,234 B1 * | 6/2001 | Saitoh | ................ | B65H 31/3027 270/58.12 |
| 2003/0155699 A1 | 8/2003 | Tamura et al. | | |

(Continued)

FOREIGN PATENT DOCUMENTS

| | | | |
|---|---|---|---|
| JP | 3658051 B2 * | 6/2005 | |
| JP | 2006008370 A * | 1/2006 | |

(Continued)

*Primary Examiner* — Jennifer Bahls

(74) *Attorney, Agent, or Firm* — WORKMAN NYDEGGER

(57) ABSTRACT

A media processing apparatus includes a media transporter, a stacking portion on which media are stacked, a binding processing portion that binds an upstream end portion of a media bundle, a pair of ejection rollers that eject the media bundle, and a displacement mechanism that displaces a first roller of the pair of ejection rollers to a nipping position at which the media bundle is nipped and a separated position at which the first roller is separated from the media bundle, in which, when the media bundle, the upstream end portion of which is closed, is to be ejected from the stacking portion, the first roller is disposed in the nipping position and ejection of the media bundle is started, the first roller is displaced to the separated position during ejection of the media bundle, and, thereafter, the first roller is disposed again at the nipping position.

13 Claims, 7 Drawing Sheets

(51) Int. Cl.
*B65H 29/12* (2006.01)
*B65H 37/04* (2006.01)
*B65H 43/00* (2006.01)

(58) Field of Classification Search
CPC . G03G 2215/00412; G03G 2215/0041; G03G 2215/004219; B65H 43/00; B65H 29/125; B65H 29/12; B65H 37/04; B41J 13/0036; B41J 13/02
See application file for complete search history.

(56) References Cited

U.S. PATENT DOCUMENTS

| | | | | |
|---|---|---|---|---|
| 2005/0023742 | A1* | 2/2005 | Tamura | B65H 45/14 270/58.11 |
| 2010/0078878 | A1* | 4/2010 | Nakamura | G03G 15/6573 271/220 |
| 2018/0079616 | A1* | 3/2018 | Nakano | B65H 37/04 |

FOREIGN PATENT DOCUMENTS

| | | | |
|---|---|---|---|
| JP | 2010-173757 | | 8/2010 |
| JP | 2011168377 | A * | 9/2011 |

* cited by examiner

MEDIA PROCESSING APPARATUS AND RECORDING APPARATUS

The present application is based on, and claims priority from U.S. patent application Ser. No. 17/021,378, filed Sep. 15, 2020, which claims priority to JP Application Serial Number 2019-169588, filed Sep. 18, 2019, the disclosure of which is hereby incorporated by reference herein in its entirety.

BACKGROUND

1. Technical Field

The present disclosure relates to a media processing apparatus and a recording apparatus.

2. Related Art

To date, there is a media processing apparatus that aligns an end portion of a media bundle, binds the end portion of the media bundle, and ejects the media bundle, the end portion of which has been bound, by rotating a pair of rollers nipping the media bundle. For example, JP-A-2010-173757 discloses a sheet processing apparatus that stacks a sheet bundle while aligning the sheet bundle on an intermediate processing tray, binds the sheet bundle by using a stapler, and ejects the sheet bundle by rotating a pair of rollers nipping the sheet bundle, the pair of rollers including an upper bundle ejection roller and a lower bundle ejection roller.

However, similar to the sheet processing apparatus of JP-A-2010-173757, in an existing media processing apparatus that aligns an end portion of a media bundle, binds the aligned end portion of the media bundle, and ejects the bound media bundle by rotating a pair of rollers nipping the media bundle, in some cases, an ejection failure occurs when ejecting the media bundle. Specifically, as the pair of rollers nip the media bundle, an end portion of which has been bound, and rotate, the plurality of media forming the media bundle become misaligned with respect to each other by the rotation of the pair of rollers, and the media bundle ends up in a bulged state; in that state, the pair of rollers may further nip the media and rotate thus damaging the media or causing wrinkles. In addition, the transport resistance of the media bundle increases due to the bulging of the media bundle, which may cause ejection failure. In particular, when the media processing apparatus is a recording apparatus that applies ink to the media to perform recording, such a tendency tends to appear markedly due to swelling of the media with application of the ink. Further, increasing the driving force of the drive motor for the pair of rollers may reduce defective ejection of the media bundle even if the media bundle has a bulge; however, in some cases, such a drive motor cannot be adopted because the cost, the load on the media, and the size of the apparatus will increase. Therefore, an object of the present disclosure is to suppress defective ejection of a media bundle.

SUMMARY

According to an aspect of the present disclosure, a media processing apparatus includes a transporter that transports media, a stacking portion on which the media transported by the transporter are stacked, a binding processing portion that binds an upstream end portion of a media bundle in a transport direction of the media, the media bundle being a bundle of the media stacked in the stacking portion, a pair of ejection rollers that eject the media bundle downstream in the transport direction by nipping the media bundle, the upstream end portion of which is bound, and by rotating, a displacement mechanism that displaces a first roller of the pair of ejection rollers to a nipping position at which the media bundle is nipped and a separated position at which the first roller is separated from the media bundle, and a control portion that controls at least the pair of ejection rollers and the displacement mechanism, in which the control portion, when the media bundle, the upstream end portion of which is bound, is to be ejected from the stacking portion, disposes the first roller at the nipping position and starts ejection of the media bundle, displaces the first roller to the separated position during ejection of the media bundle, and thereafter, disposes the first roller again at the nipping position to perform ejection of the media bundle.

DESCRIPTION OF EXEMPLARY EMBODIMENTS

Figure 1:
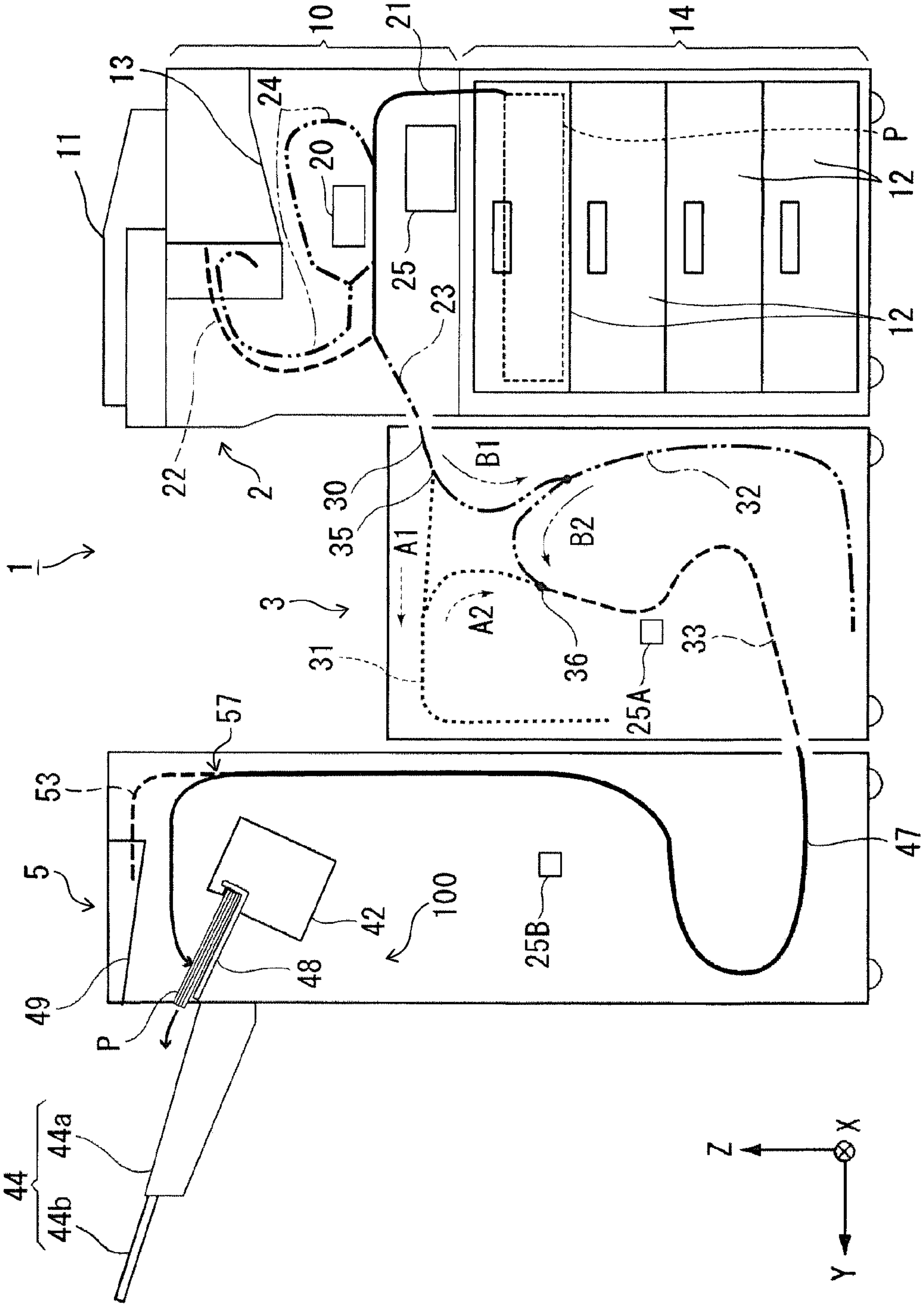
FIG. 1 is a schematic diagram of a recording system as a recording apparatus including an end unit that is a media processing apparatus according to an embodiment of the present disclosure.

At first, the present disclosure will be schematically described.

According to a first aspect of the present disclosure, a media processing apparatus includes a transporter that transports media, a stacking portion on which the media transported by the transporter are stacked, a binding processing portion that binds an upstream end portion of a media bundle in a transport direction of the media, the media bundle being a bundle of the media stacked in the stacking portion, a pair of ejection rollers that eject the media bundle downstream in the transport direction by nipping the media bundle, the upstream end portion of which is bound, and by rotating, a displacement mechanism that displaces a first roller of the pair of ejection rollers to a nipping position at which the media bundle is nipped and a separated position at which the first roller is separated from the media bundle, and a control portion that controls at least the pair of ejection rollers and the displacement mechanism, in which the control portion, when the media bundle, the upstream end portion of which is bound, is to be ejected from the stacking portion, disposes the first roller at the nipping position and starts ejection of the media bundle, displaces the first roller to the separated position during ejection of the media bundle, and thereafter, disposes the first roller again at the nipping position to perform ejection of the media bundle.

According to this aspect, when the media bundle is to be ejected, the first roller is disposed at the nipping position to start ejection of the media bundle, the first roller is displaced to the separated position during ejection of the media bundle, and the first roller is disposed again at the nipping position to perform ejection of the media bundle. That is, misalignment of a plurality of media forming a media bundle, which occurs when nipping the media bundle with the first roller and ejecting the media bundle, and bulging of the media bundle due to the misalignment are eliminated by momentarily displacing the first roller to the separated position, then, the media bundle in which misalignment and bulging have been eliminated is again brought back to the ejection. Therefore, defective ejection of the media bundle can be suppressed.

In a second aspect of the present disclosure according to the first aspect, the stacking portion has a stacking surface on which the media bundle is stacked in an orientation in which the media bundle is inclined upward from upstream to downstream in the transport direction, and a reverse movement suppressing portion that suppresses reverse movement of the media bundle stacked on the stacking surface from downstream to upstream in the transport direction, and the control portion controls the reverse movement suppressing portion to suppress reverse movement of the media bundle when displacing the first roller to the separated position during ejection of the media bundle.

According to this aspect, by providing the stacking surface in which the media bundle is stacked in an orientation in which the media bundle is inclined upward from the upstream side to the downstream side in the transport direction, it becomes easy to align the upstream end portion of the media bundle. Even when the stacking surface has such a configuration, the reverse movement suppressing portion can suppress the media bundle from moving in a direction opposite to an ejection direction when the first roller is displaced to the separated position.

In a third aspect of the present disclosure according to the second aspect, the reverse movement suppressing portion is a pressing member that presses the media bundle toward the stacking surface, and the control portion controls the pressing member to press the media bundle toward the stacking surface when displacing the first roller to the separated position during ejection of the media bundle.

According to this aspect, the reverse movement suppressing portion can be easily configured by using a pressing member that presses the media bundle toward the stacking surface.

In a fourth aspect of the present disclosure according to the third aspect, the media processing apparatus further includes an aligning portion that rotates in contact with the media in the stacking portion and aligns the upstream end portion of the media, in which the aligning portion also serves as the pressing member by maintaining a state of contact with the media.

According to this aspect, the media stacked in the stacking portion can be aligned by paddles, and the paddles also serve as a pressing member, so that the apparatus configuration can be simplified.

In a fifth aspect of the present disclosure according to the fourth aspect, the aligning portion is configured to rotate in a state of contact with the media in a direction opposite to a rotation direction for aligning the upstream end portion.

According to this aspect, the paddles are configured to move while being in contact with the media in a direction opposite to the rotation direction when aligning the upstream end portion. That is, the paddles are configured so as to move in a direction that eliminates misalignment of the plurality of media forming the media bundle. Therefore, ejection failure of the media bundle can be suppressed particularly effectively.

In a sixth aspect of the present disclosure according to any one of the third to fifth aspects, the control portion, when displacing the first roller to the separated position during the ejection of the media bundle and then disposing the first roller to the nipping position again, resumes rotation of the pair of ejection rollers after releasing pressing of the media bundle by the pressing member.

According to this aspect, when the first roller is displaced to the separated position during the ejection of the media bundle and then the first roller is disposed again at the nipping position, the pressing of the media bundle by the pressing member is released, and then the rotation of the pair of ejection rollers is restarted. Therefore, it is possible to suppress the load on the media by restarting the rotation of the pair of ejection rollers before the pressing of the media bundle by the pressing member is released.

In a seventh aspect of the present disclosure according to any one of the first to sixth aspects, a second roller of the pair of ejection rollers is a driving roller to which a driving force is applied to rotate, and the first roller is a driven roller that rotates with rotation of the second roller, and the first roller is disposed above the second roller.

According to this aspect, by configuring the first roller disposed above to be displaced to the nipping position and the separated position, it is possible to suppress the movement of the second roller that supports the media bundle from the lower side, and the media bundle is displaced as the pair of ejection rollers is displaced, and it is possible to prevent the media bundle from moving in an up-down direction due to the displacement of the pair of ejection rollers. In addition, by disposing the first roller, which is a driven roller that is generally smaller and lighter than the driving roller, to the nipping position and the separated position, the load associated with the displacement of the pair of ejection rollers can be reduced.

In an eighth aspect of the present disclosure according to any one of the first to seventh aspects, when viewed from an ejection direction of the media bundle ejected by the pair of ejection rollers, the nipping position of the media bundle nipped by the pair of ejection rollers overlaps the binding processing position of the media bundle bound by the binding processing portion.

According to this aspect, since the media bundle is ejected by being nipped at a position overlapping the binding processing position in the ejection direction of the media bundle, it is possible to eject the media bundle by nipping the media bundle along a line extending from a position fixed by performing the binding processing, therefore, defective ejection of the media bundle can be suppressed particularly effectively.

In a ninth aspect of the present disclosure according to any one of the first to eighth aspects, the control portion, when the media bundle is to be ejected, changes at least one of a number of times the first roller is displaced to the separated position, a separation time of the first roller, a time until the first roller is displaced to the separated position, an ejection speed of the media bundle, and a separation distance of the first roller from the media bundle in accordance with a size of the media.

According to this aspect, it becomes possible to set preferable ejection conditions in accordance with the size of the media, and it is possible to particularly effectively suppress defective ejection of the media bundle.

In a tenth aspect of the present disclosure according to any one of the first to ninth aspects, the control portion, when the media bundle is to be ejected, changes at least one of a number of times the first roller is displaced to the separated position, a separation time of the first roller, a time until the first roller is displaced to the separated position, an ejection speed of the media bundle, and a separation distance of the first roller from the media bundle in accordance with a number of the media in the media bundle.

According to this aspect, it becomes possible to set preferable ejection conditions in accordance with the number of the media in the media bundle, and it is possible to effectively suppress defective ejection of the media bundle.

In an eleventh aspect of the present disclosure, a recording apparatus includes a recording portion that records on media by using ink; and the media processing apparatus according to any one of the first to tenth aspects that performs processing on the media recorded on by the recording portion, in which the control portion, when the media bundle is to be ejected, changes at least one of a number of times the first roller is displaced to the separated position, a separation time of the first roller, a time until the first roller is displaced to the separated position, an ejection speed of the media bundle, and a separation distance of the first roller from the media bundle in accordance with an amount of ink used for recording on the media.

According to this aspect, it becomes possible to set preferable ejection conditions in accordance with the amount of ink used for recording on the media, and it is possible to effectively suppress defective ejection of the media bundle.

Hereinafter, an end unit 5 as a media processing apparatus according to an embodiment of the present disclosure will be described in detail below with reference to the accompanying drawings. In the XYZ coordinate system illustrated in each drawing, the X-axis direction indicates the apparatus depth direction, the Y-axis direction indicates the apparatus width direction, and the Z-axis direction indicates the apparatus height direction. Further, in the following, as an example of the recording apparatus including the end unit 5 according to the present disclosure, a recording system 1 including a recording unit 2, an intermediate unit 3, and the end unit 5 will be described as an example. Further, a recording apparatus of this embodiment includes the recording unit 2 that records on media P, and the end unit 5 as a media processing apparatus, which are separately provided.

Overview of Recording System

The recording system 1 illustrated in FIG. 1 includes, for example, the recording unit 2, the intermediate unit 3, and the end unit 5 in order from right to left in FIG. 1. Further, FIG. 1 is a front surface view and a user can perform various operations from the front surface side. The recording unit 2 performs recording on the transported medium P. The intermediate unit 3 receives from the recording unit 2 the medium P after recording has been performed and delivers it to the end unit 5. The end unit 5 performs end binding processing for binding the received media P into a bundle. Hereinafter, the recording unit 2, the intermediate unit 3, and the end unit 5 will be described in detail in order.

Recording Unit

The recording unit 2 will be described with reference to FIG. 1. The recording unit 2 is configured as a multifunction apparatus including a printer portion 10 having a line head 20 as a recording portion that performs recording on the media P, and a scanner portion 11. In this embodiment, the line head 20 is configured as a so-called ink jet recording head that performs recording by ejecting ink, which is a liquid, onto the medium P.

A cassette housing portion 14 including a plurality of media housing cassettes 12 is provided below the printer portion 10. Each of the media P housed in the media housing cassettes 12 is sent to a recording area of the line head 20 through a feeding path 21 illustrated by a solid line in FIG. 1, and a recording operation is performed. The medium P, after recording has been performed thereon by the line head 20, is sent to either of a first ejection path 22 for ejecting the medium P to a post-recording ejection tray 13 provided above the line head 20 or a second ejection path 23 for sending the medium P to the intermediate unit 3.

In FIG. 1, the first ejection path 22 is indicated by a broken line, and the second ejection path 23 is indicated by an alternate long and short dash line. The second ejection path 23 extends in the +Y direction of the recording unit 2 and delivers the medium P to a receiving path 30 of the intermediate unit 3, which is adjacent thereto.

In addition, the recording unit 2 includes an inverting path 24 indicated by a two-dot chain line in FIG. 1, and after recording has been performed on a first surface of the medium P, the medium P is inverted to enable recording to be performed on a second surface of the medium P. Further, in each of the feeding path 21, the first ejection path 22, the second ejection path 23, and the inverting path 24, one or more pairs of transport rollers (not illustrated) are disposed as an example of a way of transporting the media P.

The recording unit 2 is provided with a control portion 25 that controls operations related to the transport and recording of the medium P in the recording unit 2. Further, the recording system 1 is configured such that the recording unit 2, the intermediate unit 3, and the end unit 5 are mechanically and electrically coupled to one another so that the medium P can be transported from the recording unit 2 to the end unit 5. The control portion 25 can control various operations in the intermediate unit 3, which is coupled to the recording unit 2, and the end unit 5. However, for example, a control portion 25A that controls the intermediate unit 3 and a control portion 25B that controls the end unit 5 may be provided separately from the control portion 25 that controls the recording unit 2.

The recording system 1 is configured such that settings of the recording unit 2, the intermediate unit 3 and the end unit 5 can be input from an operation panel (not illustrated). The operation panel can be provided in the recording unit 2 as an example.

Intermediate Unit

The intermediate unit 3 will be described with reference to FIG. 1. The intermediate unit 3 illustrated in FIG. 1 delivers the medium P received from the recording unit 2 to the end unit 5. The intermediate unit 3 is disposed between the recording unit 2 and the end unit 5. The medium P transported through the second ejection path 23 of the recording unit 2 is received by the intermediate unit 3 from the receiving path 30 and transported toward the end unit 5. Further, the receiving path 30 is illustrated by a solid line in FIG. 1.

In the intermediate unit 3, there are two transport paths along which the medium P is transported. The first transport path is a path through which the medium P is transported from the receiving path 30 to a merged path 33 through a first switchback path 31 illustrated by a dotted line. The second path is a path through which the medium P is transported from the receiving path 30 to the merged path 33 through a second switchback path 32 illustrated by a two-dot chain line in FIG. 1. The first switchback path 31 is a path that, after receiving the medium P in the arrow A1 direction, switches back the medium in an arrow A2 direction. The second switchback path 32 is a path that, after receiving the medium in the arrow B1 direction, switches back the medium in an arrow B2 direction.

The receiving path 30 branches into the first switchback path 31 and the second switchback path 32 at a branching portion 35. The branching portion 35 is provided with a flap (not illustrated) that switches the destination of the medium P to either the first switchback path 31 or the second switchback path 32.

In addition, the first switchback path 31 and the second switchback path 32 merge at a merging portion 36. Therefore, even if the medium P is sent from the receiving path 30 to either the first switchback path 31 or the second switchback path 32, the medium P can be sent to the end unit 5 through the merged path 33, which is shared.

The medium P transported through the merged path 33 is delivered to a first transport path 47 of the end unit 5 from the +Y direction of the intermediate unit 3. Further, one or more pairs of transport rollers (not illustrated) are disposed in each of the receiving path 30, the first switchback path 31, the second switchback path 32, and the merged path 33.

When recording is continuously performed on a plurality of media P in the recording unit 2, the media P having entered the intermediate unit 3 are alternately sent to the transport path passing through the first switchback path 31 and the transport path passing through the second switchback path 32. By this, it is possible to increase the media transport throughput in the intermediate unit 3.

In addition, in the case where recording is performed by ejecting liquid ink to the medium P as in the line head 20 of this embodiment, when the medium P is wet when processing is performed by the end unit 5 in the subsequent stage, the recording surface may be rubbed or the consistency of the medium P may become poor. By transferring the medium P after recording from the recording unit 2 to the end unit 5 via the intermediate unit 3, it is possible to lengthen the transportation time until the medium P is sent to the end unit 5 after recording and to further dry the medium P before the medium P reaches the end unit 5.

End Unit

First, the outline of the end unit 5 will be described with reference to FIG. 1. Then, after the outline of the end unit 5 has been described, an end binding processing unit 100, which is a main portion of the end unit 5 of this embodiment, will be described with reference to FIGS. 2 to 7. The end unit 5 includes the first transport path 47 that is continuous with a binding processing portion 42 that performs end binding processing. The end binding processing is processing for binding an upstream end portion Pu (refer to FIG. 3, etc.) in the transport direction of the medium P. Further, here, the "upstream end portion Pu" does not mean only the distal end of the upstream end portion, but means a region near the distal end including the distal end of the upstream end portion.

The end unit 5 includes a first tray 44 that receives the media P that are ejected from the end unit 5 after the end-binding processing. The first tray 44 is provided so as to protrude from the end unit 5 in the +Y direction. In this embodiment, the first tray 44 includes a base portion 44*a* and an extension portion 44*b*, and the extension portion 44*b* is configured to be stored in the base portion 44*a*.

In this embodiment, the binding processing portion 42 is a stapler that performs end binding processing in which a plurality of media P are stacked and an upstream end portion Pu thereof is bound. Further, the binding processing portion 42 may be configured to be able to perform punching processing for punching holes at predetermined positions on the media P.

The medium P received by the end unit 5 is transported along the first transport path 47 indicated by a solid line in FIG. 1. The medium P transported along the first transport path 47 is sent to a processing tray 48, and is stacked on the processing tray 48 with the distal end of the upstream end portion Pu in the transport direction aligned. When a predetermined number of media P are stacked on the processing tray 48, the end binding processing by the binding processing portion 42 is performed on the upstream end portion Pu of the media P. After the end-binding processing, the media P are ejected to the first tray 44 by a pair of ejection rollers 101 illustrated in FIG. 2.

In addition, a second transport path 53, which branches from the first transport path 47 at a branch portion 57, is coupled to the first transport path 47. The second transport path 53 is a path for ejecting the media P to an upper tray 49 provided at an upper portion of the end unit 5. The media P that are not processed by the binding processing portion 42 can be stacked on the upper tray 49.

In each of the first transport path 47 and the second transport path 53, a plurality of pairs of transport rollers (not illustrated) are disposed as an example of a way of transporting the media P. In addition, the branch portion 57 is provided with a flap (not illustrated) for switching the destination of the media P.

End Binding Processing Unit

Next, the end binding processing unit 100 will be described in detail with reference to FIGS. 2 to 7. First, the outline of the end binding processing unit 100 will be described mainly with reference to FIG. 2.

Figure 2:
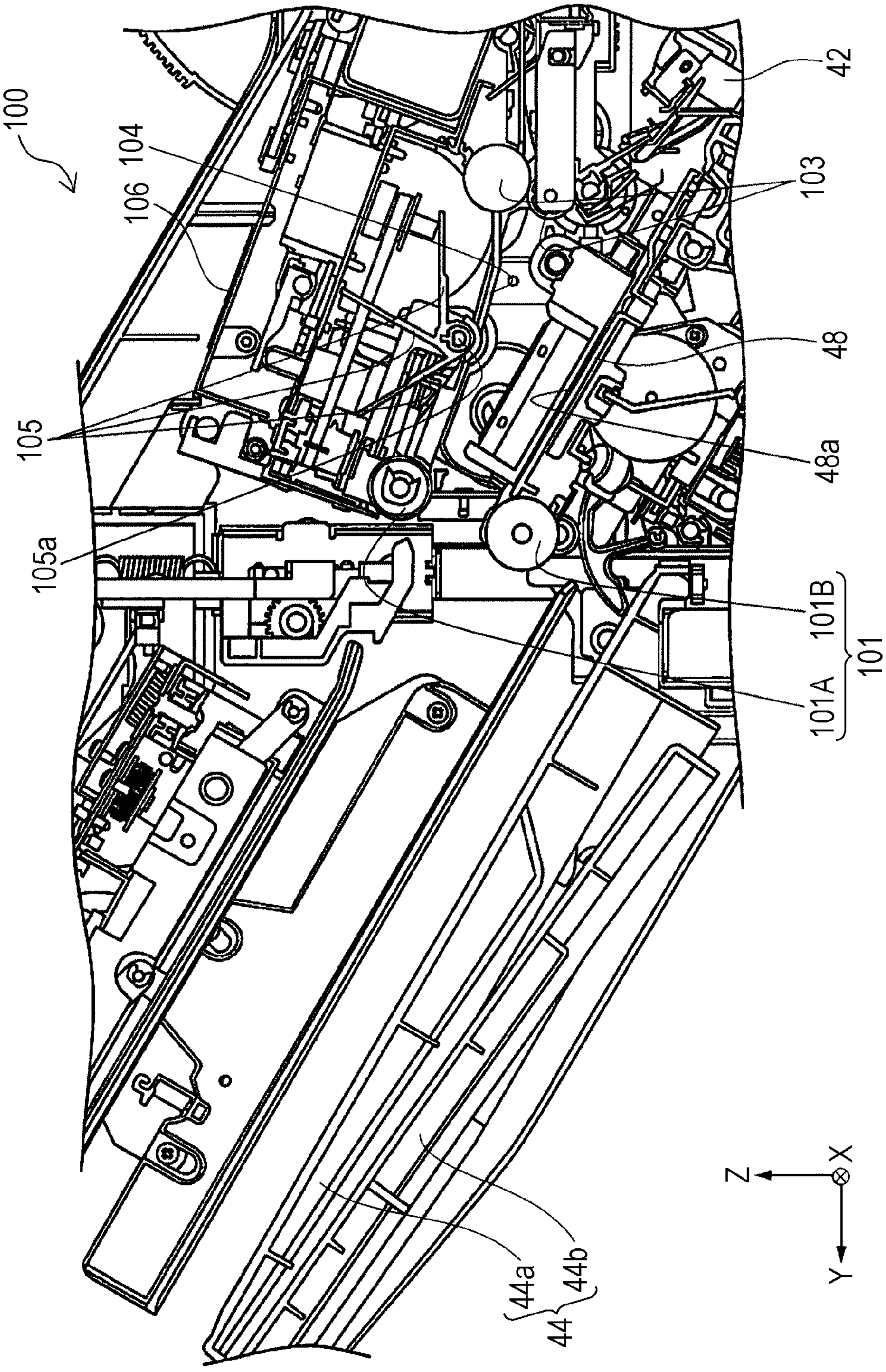
FIG. 2 is a front view illustrating a configuration of an end binding processing unit in the end unit in FIG. 1.

As illustrated in FIG. 2, the end binding processing unit 100 includes a driven roller 101A as a first roller that forms the pair of ejection rollers 101, a pair of transport rollers 103 that transport the media P to the processing tray 48 as a stacking portion, paddles 105 for aligning the upstream end portion Pu in the transport direction of the media P stacked on the processing tray 48, an upper guide 104 forming a transport path of the media P on a side facing the processing tray 48, and a swing unit 106 that swings about a swing shaft 102 (refer to FIG. 7) extending in the X-axis direction. Furthermore, the binding processing portion 42, the processing tray 48, and a driving roller 101B as a second roller that is provided at the end of the processing tray 48 on a side opposite to the binding processing portion 42 side and that, together with the driven roller 101A, forms the pair of ejection rollers 101, and the first tray 44 are provided.

Further, the control portion 25B provided in the end unit 5 is configured to control the pair of ejection rollers 101, the swing unit 106 as a displacement mechanism, and each component of the swing unit 106. That is, the end unit 5 of this embodiment includes the pair of transport rollers 103 as a transporter that transports the media P, the processing tray 48 on which the media P transported by the pair of transport rollers 103 are stacked, the paddles 105 as an alignment portion that aligns the upstream end portion Pu of the media bundle PB (refer to FIG. 3), which is a bundle of the media P stacked on the processing tray 48, the binding processing portion 42 that binds the upstream end portion Pu of the media bundle PB aligned by the paddles 105, the pair of ejection rollers 101 that eject the media bundle PB downstream in the transport direction of the media P by nipping the bound media bundle PB and by rotating, the swing unit 106 as a displacement mechanism that displaces the driven roller 101A of the pair of ejection rollers 101, and the control portion 25B that controls the pair of ejection rollers 101, the swing unit 106, and the like.

Here, the control portion 25B, when the media bundle PB is to be ejected, disposes the driven roller 101A at the nipping position of the media bundle PB to start ejecting the media bundle PB, and displaces the driven roller 101A to a separated position where the driven roller 101A is separated from the media bundle PB during ejection of the media bundle PB, and controls the driven roller 101A to be disposed again at the nipping position to complete ejection of the media bundle PB. By the control portion 25B performing such control, misalignment of a plurality of media P forming the media bundle PB caused by nipping and ejecting the media bundle PB with the pair of ejection rollers 101, and bulging of the media bundle PB due to the misalignment can be eliminated by displacing the driven roller 101A to the separated position and the media bundle PB can be ejected. Therefore, the end unit 5 of this embodiment has a configuration capable of suppressing defective ejection of the media bundle PB.

Next, the operation of the end binding processing unit 100 when ejecting the media bundle PB will be specifically described with reference to FIGS. 3 to 6. Further, the operations of the end binding processing unit 100 described below are all executed under the control of the control portion 25B. Here, in the recording system 1 of this embodiment, because the end unit 5 also includes a control portion, the end unit 5 alone corresponds to the media processing apparatus of the present disclosure; however, for example, when the end unit 5 is not provided with a control portion and only the recording unit 2 is provided with a control portion and the control portion controls the operation of the end binding processing unit 100 and the like, the recording system 1 corresponds to the recording apparatus of the present disclosure and also corresponds to the media processing apparatus of the present disclosure.

Figure 3:
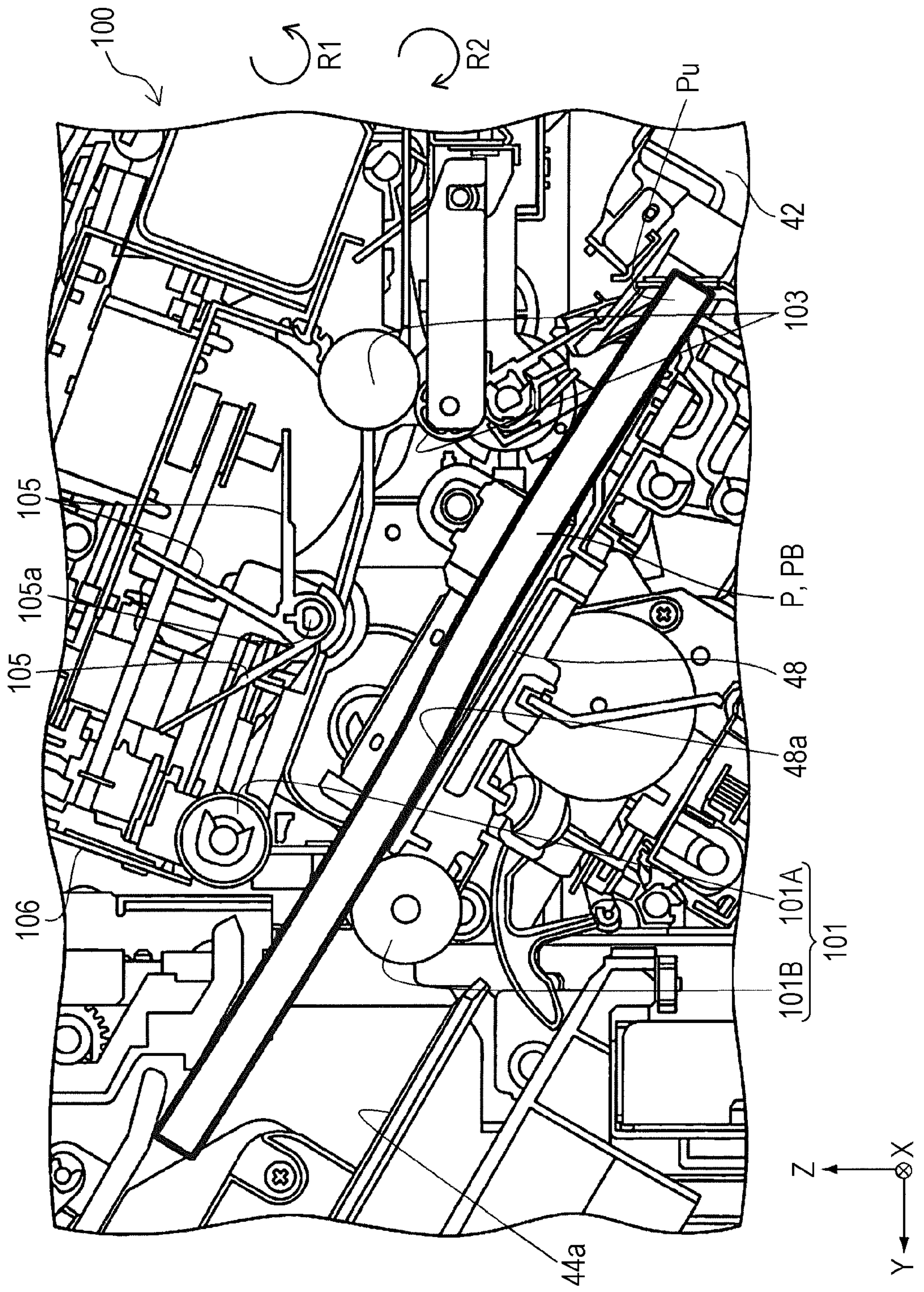
FIG. 3 is a front view illustrating a state in which a media bundle is stacked on a processing tray of the end unit in FIG. 1.

FIG. 3 illustrates a state in which a plurality of media P are stacked on the processing tray 48 and a media bundle PB which is a bundle of media P is formed. When forming the media bundle PB, first, the plurality of media P are transported from the first transport path 47 to the processing tray 48 by the pair of transport rollers 103 and the like. Then, with the paddles 105 in contact with the media P, the upstream end portion Pu is aligned by rotating the paddles 105 about a rotation shaft 105*a*, which extends in the X-axis direction, in the rotation direction R1. Then, the binding process is performed by the binding processing portion 42 with the upstream end portion Pu aligned, and the media bundle PB is formed.

Figure 4:
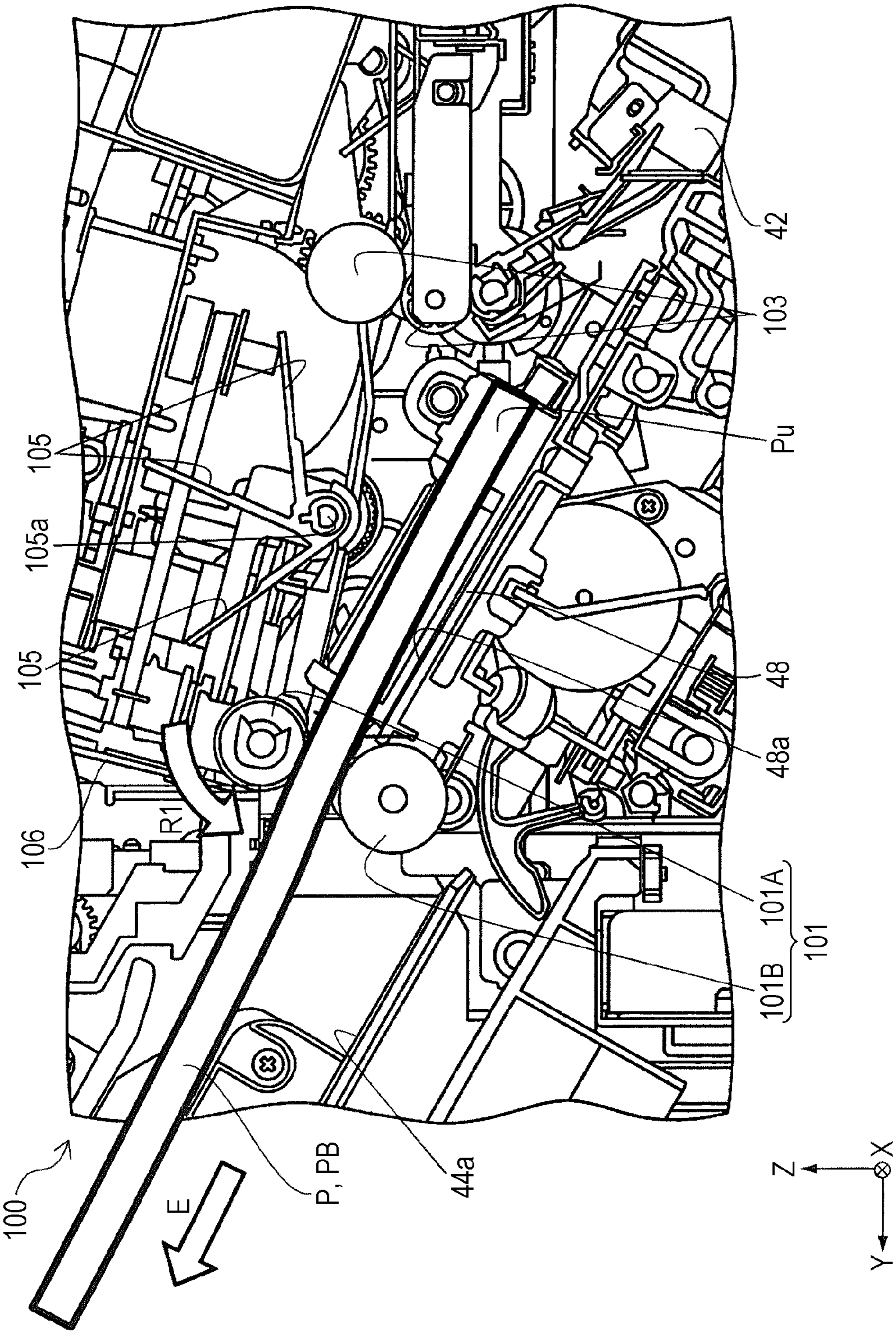
FIG. 4 is a front view illustrating a state in which the media bundle, an upstream end portion of which has been bound, is ejected by a pair of ejection rollers.

When ejecting the media bundle PB, the swing unit 106 is displaced so that the state illustrated in FIG. 3 is first changed to the state illustrated in FIG. 4. Specifically, the swing unit 106 is swung about the swing shaft 102 in the rotation direction R1, and is disposed from the separated position illustrated in FIG. 3 to the nipping position illustrated in FIG. 4. Then, the swing unit 106 is disposed at the nipping position, and the driving roller 101B is rotated in the rotation direction R1 with the pair of ejection rollers 101 nipping the media bundle PB, thereby ejecting the media bundle PB in an ejection direction E.

Figure 5:
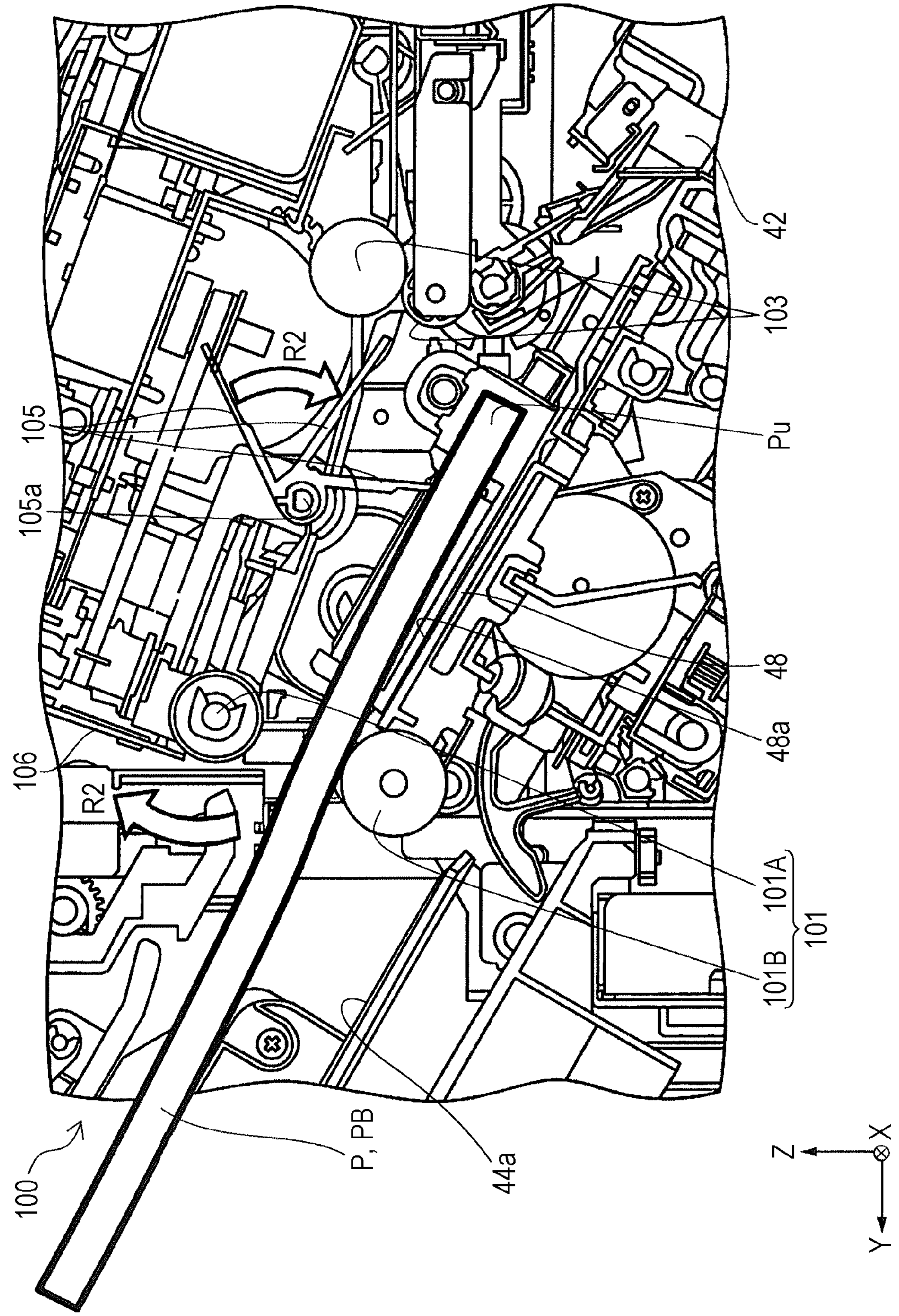
FIG. 5 is a front view illustrating a state in which a first roller is separated to a separated position and the media bundle is held by paddles while the media bundle, the upstream end portion of which has been bound, is being ejected.

When the media bundle PB is ejected in the ejection direction E by a predetermined amount, the swing unit 106 and the paddles 105 are displaced from the state illustrated in FIG. 4 to the state illustrated in FIG. 5. Specifically, the swing unit 106 is swung about the swing shaft 102 in the rotation direction R2 so as to be disposed from the nipping position illustrated in FIG. 4 to the separated position illustrated in FIG. 5 and the paddles 105 are maintained in contact with the media bundle PB. Further, when the paddles 105 are maintained in contact with the media bundle PB from the state illustrated in FIG. 4 to the state illustrated in FIG. 5, the paddles 105 are rotated about the rotation shaft 105*a* in the rotation direction R2.

As illustrated in FIG. 4, by rotating the driving roller 101B in the rotation direction R1 with the pair of ejection rollers 101 holding the media bundle PB, on the upstream end portion Pu side of the media bundle PB, the plurality of media P forming the media bundle PB may become misaligned with respect to each other due to the rotation of the pair of ejection rollers 101 and may end up in a bulged state. However, by displacing the swing unit 106 from the state illustrated in FIG. 4 to the state illustrated in FIG. 5, even if the nipping of the media bundle PB by the pair of ejection rollers 101 is released and a bulge is formed on the upstream end portion Pu side, the bulge is eliminated. Further, the holding force of the paddles 105 is weaker than the holding force of the pair of ejection rollers 101. The force acting in the direction in which the bulge based on the rigidity of the medium is eliminated is often weaker than the nipping force of the pair of ejection rollers 101, but is often stronger than the pressing force of the paddles 105. For this reason, it is difficult to eliminate bulging when the media bundle PB is nipped by the pair of ejection rollers 101; however, bulging is easily eliminated when the paddles 105 hold down the media bundle PB.

Further, a stacking surface 48*a* of the processing tray 48 of this embodiment is configured such that the media bundle PB is stacked in an orientation in which the media bundle PB is inclined upward from the upstream side to the downstream side in the transport direction of the media P. Therefore, when the driven roller 101A is displaced to the separated position during the ejection of the media bundle PB, the media bundle PB may move in a direction opposite to the ejection direction E. However, in the end binding processing unit 100 of this embodiment, the paddles 105 are maintained in contact with the media bundle PB. That is, when the driven roller 101A is displaced to the separated position during the ejection of the media bundle PB, the media bundle PB is restrained from moving from the downstream side to the upstream side in the transport direction of the media P while the paddles 105 as a reverse movement suppressing portion and a pressing member maintain the state in which the media bundle PB is pressed toward the stacking surface 48*a*.

The end binding processing unit 100 of this embodiment includes the stacking surface 48*a* on which the media bundle PB is stacked in an orientation in which the media bundle PB is inclined upward from the upstream side to the downstream side in the transport direction of the medium P, and thus the alignment of the upstream end portion Pu of the media bundle PB is facilitated. This is because the upstream end portion Pu of the media bundle PB can be aligned using gravity. In the end binding processing unit 100 of this embodiment, even if the stacking surface 48*a* has such a configuration, the paddles 105 as a reverse movement suppressing portion and a pressing member are configured to prevent the media bundle PB from moving in the direction opposite to the ejection direction E when the driven roller 101A is displaced to the separated position.

Figure 6:
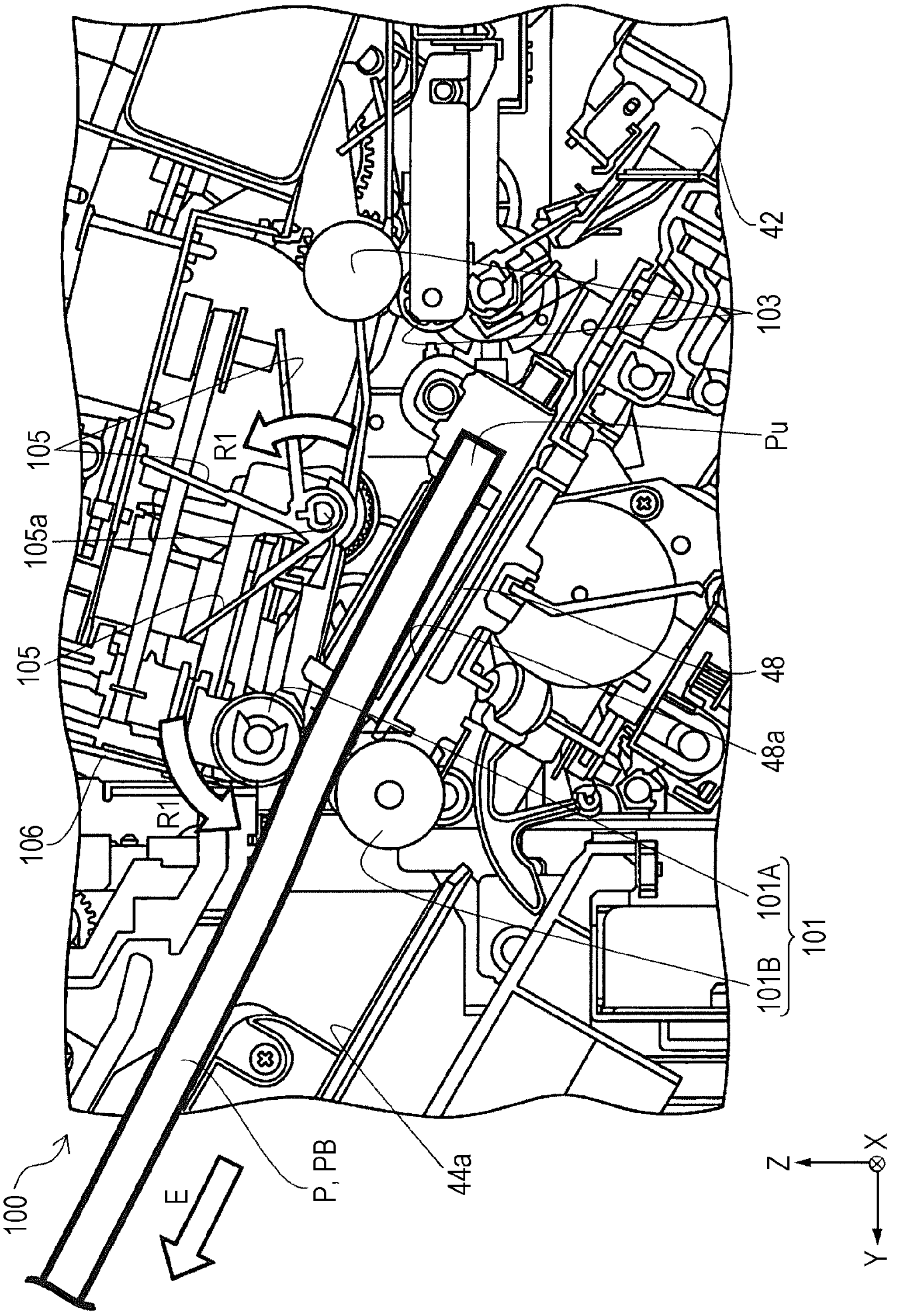
FIG. 6 is a front view illustrating a state in which the first roller is returned to the nipping position again from the state illustrated in FIG. 5, the pressing of the media bundle by the paddles is released, and the media bundle is ejected by the pair of ejection rollers.

Then, thereafter, the swing unit 106 and the paddles 105 are displaced from the state illustrated in FIG. 5 to the state illustrated in FIG. 6. Specifically, the swing unit 106 is swung about the swing shaft 102 in the rotation direction R1, and is disposed from the separated position illustrated in FIG. 5 to the nipping position illustrated in FIG. 6, and the paddles 105 are released from the state of being in contact with the media bundle PB. Further, when the paddles 105 are displaced from the state illustrated in FIG. 5 to the state illustrated in FIG. 6, the paddles 105 are rotated about the rotation shaft 105*a* in the rotation direction R1. Then, by maintaining the state illustrated in FIG. 6 and rotating the driving roller 101B in the rotation direction R1 with the pair of ejection rollers 101 nipping the media bundle PB, the ejection of the media bundle PB in the ejection direction E is completed.

Here, when the control portion 25B displaces the driven roller 101A to the separated position as illustrated in FIG. 5 during the ejection of the media bundle PB and then disposes the driven roller 101A at the nipping position as illustrated in FIG. 6, control is performed to restart the rotation of the pair of ejection rollers 101 after releasing the pressing of the media bundle PB by the paddles 105. By the control portion 25B performing such control, by restarting the rotation of the pair of ejection rollers 101 before releasing the pressing of the media bundle PB by the paddles 105, it is possible to reduce the load on the media P.

Figure 7:
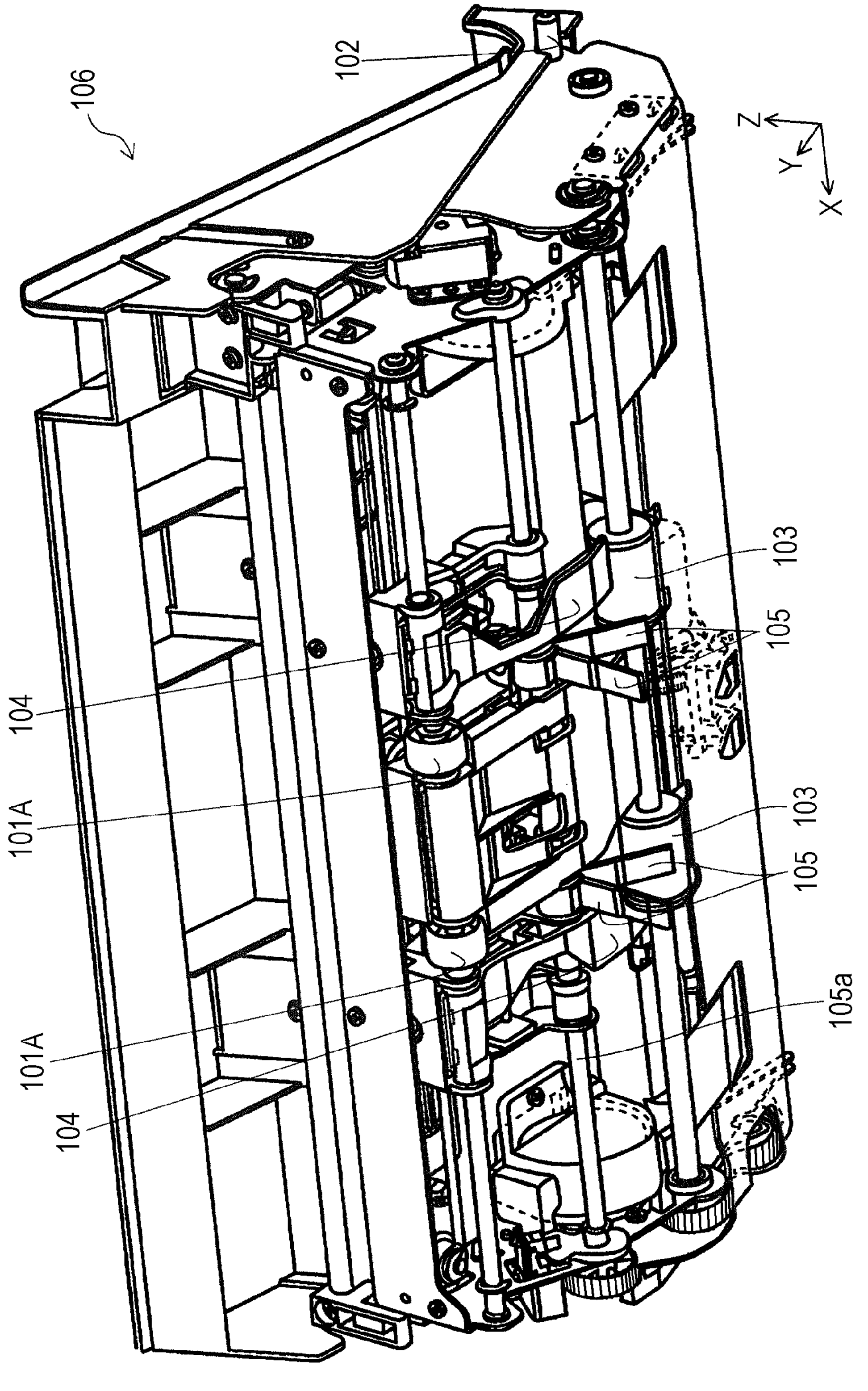
FIG. 7 is a perspective view of a swing unit in the end unit in FIG. 1.

Further, as illustrated in FIG. 7, the swing unit 106 of this embodiment includes the upper guide 104 that holds the media bundle PB from the side facing the stacking surface 48*a*. In the swing unit 106 of this embodiment, the paddles 105 serve as the reverse movement suppressing portion and the pressing member; however, the upper guide 104 may also serve as the reverse movement suppressing portion and the pressing member. By making the paddles 105 or the upper guide 104 also serve as the reverse movement suppressing portion and the pressing member, these configurations can be simplified. However, for example, a configuration may be used in which reverse movement of the media bundle PB is suppressed by causing a protrusion to advance from the processing tray 48 side when the media bundle PB has moved in the ejection direction E by a predetermined amount, and by using the protrusion as a reverse movement suppressing portion by abutting the protrusion on the distal end of the upstream end portion Pu of the media bundle PB. In this way, the pressing member and the reverse movement suppressing portion are not limited to the paddles 105 and the upper guide 104.

In addition, as illustrated in FIG. 7, the swing unit 106 of this embodiment has two driven rollers 101A in a direction intersecting the ejection direction E of the media bundle PB. The position where the driven roller 101A is formed when viewed from the ejection direction E overlaps with the position where the binding processing portion 42 performs binding processing on the media bundle PB.

In other words, in the end unit 5 of this embodiment, when viewed from the ejection direction E at which the media bundle PB is ejected by the pair of ejection rollers 101, the nipping position at which the media bundle PB is nipped by the pair of ejection rollers 101 overlaps with the position at which binding processing is performed on the media bundle PB by the binding processing portion 42. For this reason, because the end unit 5 of this embodiment can eject the media bundle PB by nipping the media bundle PB along a line extending from a position fixed by the binding processing, the configuration is such that defective ejection of the media bundle PB can be suppressed particularly effectively.

In addition, as described above, the paddles 105 of this embodiment are configured to rotate while being in contact with the medium P in a rotation direction R2 that is a direction opposite to the rotation direction R1 when aligning the upstream end portion Pu. With such a configuration, the paddles 105 of this embodiment can move in a direction in which misalignment of the plurality of media P that make up the media bundle PB is eliminated. Therefore, the end unit 5 of this embodiment can particularly effectively suppress defective ejection of the media bundle PB.

As illustrated in FIGS. 2 to 6, the pair of ejection rollers 101 include the driving roller 101B to which a rotating driving force is applied, and the driven roller 101A that rotates with the rotation of the driving roller 101B, and the driven roller 101A is disposed above the driving roller 101B. In the end unit 5 of this embodiment, by configuring the driven roller 101A disposed above the media bundle PB so as to be displaced to the nipping position and the separated position, it is possible to suppress the movement of the driving roller 101B that supports the media bundle PB from below, and to prevent the media bundle PB from moving in the up-down direction with the displacement of the pair of ejection rollers 101. In addition, since the driven roller, which is generally smaller and lighter than the driving roller, is displaced to the nipping position and the separated position, in the end unit 5 of this embodiment, the load associated with the displacement of the pair of ejection rollers 101 is reduced.

In addition, when the media bundle PB is to be ejected, the control portion 25B of this embodiment can change at least one of the number of times the driven roller 101A is displaced to the separated position, that is, the number of times the pair of ejection rollers 101 release the nipping when ejecting the media bundle PB, the separation time of the driven roller 101A, the time until the driven roller 101A is displaced to the separated position, that is, the moving speed of the swing unit 106, the ejection speed of the media bundle PB, that is, the rotation speed of the driving roller 101B, and the separation distance of the driven roller 101A from the media bundle PB, that is, the movement distance of the swing unit 106 in accordance with the size of the medium P to be used, particularly the length in the ejection direction. For this reason, the end unit 5 of this embodiment can be set to preferable ejection conditions in accordance with the size of the medium P to be used, and has a configuration capable of particularly effectively suppressing defective ejection of the media bundle PB.

In addition, when the media bundle PB is to be ejected, the control portion 25B of this embodiment can change at least one of the number of times the driven roller 101A is displaced to the separated position, the separation time of the driven roller 101A, the time until the driven roller 101A is displaced to the separated position, the ejection speed of the media bundle PB, and the distance between the driven roller 101A and the media bundle PB in accordance with the number of media P forming the media bundle PB. For this reason, the end unit 5 of this embodiment can be set to preferable ejection conditions in accordance with the number of media P in the media bundle PB, and has a configuration capable of particularly effectively suppressing defective ejection of the media bundle PB.

Furthermore, the recording system 1 as the recording apparatus of this embodiment includes the line head 20 as a recording portion that records on the medium P using ink, and the end unit 5 as a media processing apparatus that processes the medium P recorded on by the line head 20; however, when ejecting the media bundle PB, the control portion 25B of this embodiment can change at least one of the number of times the driven roller 101A is displaced to the separated position, the separation time of the driven roller 101A, the time until the driven roller 101A is displaced to the separated position, the ejection speed of the media bundle PB, and the distance between the driven roller 101A and media bundle PB in accordance with the amount of ink used for recording on the media P. For this reason, the recording system 1 of this embodiment can be set to preferable ejection conditions in accordance with the amount of ink used for recording on the media P, and has a configuration capable of particularly effectively suppressing defective ejection of the media bundle PB.

Below, Table 1 summarizes specific examples of the control of the control portion 25B for the above.

TABLE 1

| | SIZE OF MEDIA | | NUMBER OF MEDIA | | AMOUNT OF INK USED | |
|---|---|---|---|---|---|---|
| | SMALL | LARGE | SMALL | LARGE | SMALL | LARGE |
| NUMBER OF TIMES DISPLACED TO SEPARATED POSITION | FEW | MANY | FEW | MANY | FEW | MANY |
| SEPARATION TIME | SHORT | LONG | SHORT | LONG | SHORT | LONG |
| TIME UNTIL DISPLACED TO SEPARATED POSITION | LONG | SHORT | LONG | SHORT | LONG | SHORT |
| EJECTION SPEED | FAST | SLOW | FAST | SLOW | FAST | SLOW |
| SEPARATION DISTANCE | SMALL | LARGE | SMALL | LARGE | SMALL | LARGE |

Further, the present disclosure is not limited to the above described embodiments, and it goes without saying that it is possible to make various modifications within the scope of the present disclosure described in the claims and that these are included in the scope of the present disclosure.

What is claimed is:

1. A media processing apparatus comprising:

a transporter that transports media;

a stacking portion on which the media transported by the transporter are stacked;

a binder that binds an upstream end portion of a media bundle in a transport direction of the media, the media bundle being a bundle of the media stacked in the stacking tray;

a pair of ejection rollers that eject the media bundle downstream in the transport direction by nipping the media bundle, the upstream end portion of the media bundle is bound, and by rotating;

a displacement mechanism comprising a swing unit that displaces a first roller of the pair of ejection rollers to a nipping position at which the media bundle is nipped and a separated position at which the first roller is separated from the media bundle; and a control portion comprising a controller that controls at least the pair of ejection rollers and the displacement mechanism, wherein the control portion, when the media bundle, the upstream end portion of the media bundle is bound, is to be ejected from the stacking tray, disposes the first roller at the nipping position and starts ejection of the media bundle, displaces the first roller to the separated position during ejection of the media bundle, and thereafter, disposes the first roller again at the nipping position to perform ejection of the media bundle, wherein the transport direction in the stacking portion is the same direction as an ejection direction in which the pair of ejection rollers ejects the media bundle, when viewed from the ejection direction, the nipping position of the media bundle nipped by the pair of ejection rollers overlaps a position at which the binder performs a binding processing operation on the media bundle, wherein the stacking portion has a stacking surface on which the media bundle is stacked in an orientation in which the media bundle is inclined upward from upstream to downstream in the transport direction and a reverse movement suppressing portion that suppresses reverse movement of the media bundle stacked on the stacking surface from downstream to upstream in the transport direction, and the control portion controls the reverse movement suppressing portion to suppress reverse movement of the media bundle when displacing the first roller to the separated position during ejection of the media bundle, wherein the reverse movement suppressing portion is a pressing member that presses the media bundle toward the stacking surface, and the control portion controls the pressing member to press the media bundle toward the stacking surface when displacing the first roller to the separated position during ejection of the media bundle.

2. The media processing apparatus according to claim 1, further comprising:

an aligning portion that rotates in contact with the media in the stacking portion and aligns upstream end portions of the media in the transport direction of the media, wherein the aligning portion also serves as the pressing member by maintaining a state of contact with the media.

3. The media processing apparatus according to claim 2, wherein the aligning portion is configured to rotate in a state of contact with the media in a direction opposite to a rotation direction for aligning the upstream end portion.

4. The media processing apparatus according to claim 1, wherein the control portion, when displacing the first roller to the separated position during the ejection of the media bundle and then disposing the first roller to the nipping position again, resumes rotation of the pair of ejection rollers after releasing pressing of the media bundle by the pressing member.

5. The media processing apparatus according to claim 1, wherein a second roller of the pair of ejection rollers is a driving roller to which a driving force is applied to rotate and the first roller is a driven roller that rotates with rotation of the second roller, and the first roller is disposed above the second roller.

6. The media processing apparatus according to claim 1, wherein when viewed from an ejection direction of the media bundle ejected by the pair of ejection rollers, the nipping position of the media bundle nipped by the pair of ejection rollers overlaps a binding processing position of the media bundle bound by the binding processing portion.

7. The media processing apparatus according to claim 1, wherein the control portion, when ejecting the media bundle, changes in accordance with a size of the media at least one of a number of times the first roller is displaced to the separated position, a separation time of the first roller, a time until the first roller is displaced to the separated position, an ejection speed of the media bundle, and a separation distance of the first roller from the media bundle.

8. The media processing apparatus according to claim 1, wherein when viewed from an ejection direction of the media bundle ejected from a downstream side of the pair of ejection rollers, the nipping position of the media bundle nipped by the pair of ejection rollers overlaps a position at which the binder performs a binding processing operation on the media bundle.

9. The media processing apparatus according to claim 1, further comprising:

a second pair of ejection rollers that is a different pair of ejection rollers than the pair of ejection rollers as a first pair of rollers, wherein a nipping position of the media bundle nipped by the first pair of ejection rollers is a first nipping position, a nipping position of the media bundle nipped by the second pair of ejection rollers is a second nipping position, and when viewed from the ejection direction, at least one of the first nipping position and the second nipping position overlaps the position at which the binder performs the binding processing operation on the media bundle.

10. The media processing apparatus according to claim 1, wherein the control portion, when ejecting the media bundle, changes in accordance with a number of the media in the media bundle an ejection speed of the media bundle.

11. The media processing apparatus according to claim 1, wherein the control portion, when ejecting the media bundle, changes in accordance with a number of the media in the media bundle an ejection speed of the media bundle by changing a speed of the first roller of the ejection roller pair.

12. A media processing apparatus comprising:

a transporter that transports media;

a stacking portion on which the media transported by the transporter are stacked;

a binding processing portion that binds an upstream end portion of a media bundle in a transport direction of the media, the media bundle being a bundle of the media stacked in the stacking portion;

a pair of ejection rollers that eject the media bundle downstream in the transport direction by nipping the media bundle, the upstream end portion of the media bundle is bound, and by rotating;

a displacement mechanism that displaces a first roller of the pair of ejection rollers to a nipping position at which the media bundle is nipped and a separated position at which the first roller is separated from the media bundle; and a control portion that controls at least the pair of ejection rollers and the displacement mechanism, wherein the control portion, when the media bundle, the upstream end portion of the media bundle is bound, is to be ejected from the stacking portion, disposes the first roller at the nipping position and starts ejection of the media bundle, displaces the first roller to the separated position during ejection of the media bundle, and thereafter, disposes the first roller again at the nipping position to perform ejection of the media bundle, the control portion, when ejecting the media bundle from the stacking portion, changes in accordance with a size of the media at least one of a number of times the first roller is displaced to the separated position, a separation time of the first roller, a time until the first roller is displaced to the separated position, an ejection speed of the media bundle, or a separation distance of the first roller from the media bundle, and wherein the transport direction in the stacking portion is parallel to an ejection direction in which the pair of ejection rollers ejects the media bundle, wherein the stacking portion has a stacking surface on which the media bundle is stacked in an orientation in which the media bundle is inclined upward from upstream to downstream in the transport direction and a reverse movement suppressing portion that suppresses reverse movement of the media bundle stacked on the stacking surface from downstream to upstream in the transport direction, and the control portion controls the reverse movement suppressing portion to suppress reverse movement of the media bundle when displacing the first roller to the separated position during ejection of the media bundle, wherein the reverse movement suppressing portion is a pressing member that presses the media bundle toward the stacking surface, and the control portion controls the pressing member to press the media bundle toward the stacking surface when displacing the first roller to the separated position during ejection of the media bundle.

13. A media processing apparatus comprising:

a transporter that transports media;

a stacking portion on which the media transported by the transporter are stacked;

a binding processing portion that binds an upstream end portion of a media bundle in a transport direction of the media, the media bundle being a bundle of the media stacked in the stacking portion;

a pair of ejection rollers that eject the media bundle downstream in the transport direction by nipping the media bundle, the upstream end portion of the media bundle is bound, and by rotating;

a displacement mechanism that displaces a first roller of the pair of ejection rollers to a nipping position at which the media bundle is nipped and a separated position at which the first roller is separated from the media bundle; and a control portion that controls at least the pair of ejection rollers and the displacement mechanism, wherein the control portion, when the media bundle, the upstream end portion of the media bundle is bound, is to be ejected from the stacking portion, disposes the first roller at the nipping position and starts ejection of the media bundle, displaces the first roller to the separated position during ejection of the media bundle, and thereafter, disposes the first roller again at the nipping position to perform ejection of the media bundle, the control portion, when ejecting the media bundle from the stacking portion, changes in accordance with a size of the media at least one of a number of times the first roller is displaced to the separated position, a separation time of the first roller, a time until the first roller is displaced to the separated position, an ejection speed of the media bundle, or a separation distance of the first roller from the media bundle, and wherein the transport direction in the stacking portion is parallel to an ejection direction in which the pair of ejection rollers ejects the media bundle, wherein the stacking portion has a stacking surface on which the media bundle is stacked in an orientation in which the media bundle is inclined upward from upstream to downstream in the transport direction and a reverse movement suppressing portion that suppresses reverse movement of the media bundle stacked on the stacking surface from downstream to upstream in the transport direction, and the control portion controls the reverse movement suppressing portion to suppress reverse movement of the media bundle when displacing the first roller to the separated position during ejection of the media bundle, wherein the reverse movement suppressing portion is a pressing member that presses the media bundle toward the stacking surface, and the control portion controls the pressing member to press the media bundle toward the stacking surface when displacing the first roller to the separated position during ejection of the media bundle.

* * * * *